United States Patent Office 3,642,913
Patented Feb. 15, 1972

3,642,913
NITRATION OF PHENOL USING RECYCLE ACID
John David Callister, Runcorn, England, and Clayton George Carlile, Stockton, N.J., assignors to American Cyanamid Company, Stamford, Conn.
No Drawing. Original application July 3, 1967, Ser. No. 650,624, now Patent No. 3,517,075, dated June 23, 1970. Divided and this application Feb. 13, 1970, Ser. No. 14,899
Int. Cl. C07c 79/26
U.S. Cl. 260—622 R
9 Claims

ABSTRACT OF THE DISCLOSURE

The problem of tar build-up in the process of nitrating phenol to produce predominantly p-nitrophenol comprising adding the phenol to a mixed acid solution having defined concentrations of $H_2SO_4$, $HNO_3$ and $HNO_2$ acids, separating the precipitated nitrophenol product, reconstituting the spent acid solution and recycling it to the nitration step of the process, is effectively counteracted by the addition of a defined minor proportion of a carboxylic acid of a defined type, such as acetic acid, to the reconstituted mixed acid solution prior to recycle thereof to the nitration step of the process.

---

This application is a division of application Ser. No. 650,624, filed July 3, 1967, now Pat. No. 3,517,075, issued June 23, 1970.

This invention relates to an improved method for the nitration of phenolic compounds. More particularly, it relates to an improved and economically advantages process for the preparation of p-nitrophenol involving the nitration of phenol.

In a copending application of Ernest A. Harvey and James F. Russ, Ser. No. 509,629, filed Nov. 24, 1965, there is disclosed and claimed a process for the preparation of p-nitrophenol and p-nitrocresol involving involving the nitration of phenol and m-cresol, respectively. In accordance with that process high yields (up to 100%) of mono-nitrated products comprised of up to 92% of p-nitrated products can be obtained by nitrating the phenol or m-cresol with nitric acid in the presence of nitrous acid and sulfuric acid under a specified combination of reaction conditions. These conditions are as follows:

(1) Employing as the nitration medium an aqueous mixed-acid solution containing (a) from about 1 to about 10 moles per liter, preferably about 3 moles per liter, of nitric acid, (b) from about 0.4 mole to about 2 moles per liter, preferably about 0.9 moles per liter, of nitrous acid and (c) from about 1.7 to about 6.4 moles per liter, preferably about 2.3 moles per liter, of sulfuric acid; the mole ratio of nitrous to nitric acid in said solution being no greater than about 1.

(2) Adding the phenolic compound (reactant) to the aqueous mixed acid solution in a manner (defined hereinbelow) which substantially completely avoids the formation of an "oil phase" in the reaction mixture during the course of the reaction, said oil phase being comprised of the phenolic compound reactant and/or the nitrated phenolic compound product; the amount of phenolic compound added to said solution being such that the moles of nitric acid present per liter of said solution always exceeds by at least one mole the moles of phenolic compound added per liter of said solution; and, the total amount of phenolic compound added being no more than 5 moles thereof per liter of said acid solution.

(3) Maintaining the nitration reaction mixture formed in 2 (above) at a temperature of from about −20° C. to about +25° C., and under a positive pressure, i.e., from 0 to about 100 p.s.i.g.

Further, as disclosed in Ser. No. 509,629, it was found that the use of an excess of nitric acid over the phenolic compound (reactant) as per (2) above, is necessary in order to limit tar formation in the reaction. Also, it was found that the presence of an "oil phase" (comprised of either the phenolic reactant or the nitrated phenolic product or both) in the reaction mass increases the formation of the ortho isomer product. To avoid this, as previously stated, applicants conduct the nitration reaction in a manner whereby the presence of an "oil phase" is eliminated. This is accomplished in one of the following ways.

(1) Aqueous or liquid phenolic compound is added to the nitration medium, slowly or portion-wise, at a rate such that it reacts substantially as fast as it is added and its solubility limit in the acid is not substantially exceeded; the addition being made while maintaining the reaction mass at a sufficiently low temperature, i.e., from −20° C., to +10° C., so that the reaction products precipitate as solids and are recovered from the reaction mixture by filtration.

(2) The phenol is added to the reaction medium, slowly or portion-wise, at such a rate that it reacts substantially as fast as it is added and the solubility limit thereof in the acid is not exceeded; the total quantity of phenol added being such that at the reaction temperature, i.e., −20° C. to +25° C., the solubility of the products formed in the acid is also not exceeded. In this case the nitrated phenolic product is recovered from the reaction mixture by solvent extraction.

(3) Solid phenolic compound is added at a sufficiently low temperature, i.e., from −20° C. to 0° C., so that it remains essentially solid and the reaction products also precipitate as solids.

It was pointed out in connection with (1), (2) and (3) that while the temperatures designated therein overlap, the prevention of any significant "oil phase" formation is accomplished at the recited temperatures in each instance by controlling the rate of addition of the phenolic compound to the nitration medium. Thus, a slower addition rate is used at the lower portion of the temperature range in each case. In general, the time of addition can vary with successful avoidance of any significant amount of oil phase formation, over a period of from about 10 minutes to 3 hours, depending on the reactant used (phenol or m-cresol) and the temperature of the reaction. Thus, in (1) the preferred temperature for phenol as reactant is −5° C., and the preferred addition time is about 3 hours.

Also, with respect to procedure (2), where both the phenolic reactant and the nitrated products are to be maintained in solution, it was pointed out that the total amount of phenolic compound which can be added to the reaction is much lower than in (1), since the solubility limit of the nitrated product in the acid solution is quite low. Accordingly, higher temperatures (i.e., 10 to 25° C.) within the specified range are preferred in order to permit addition of the maximum amount of the phenolic compound without exceeding the solubility limit of the products. Although this procedure provides equally high yields of para-nitrated products on the basis of phenolic compound charged, it is less advantageous than (1) in terms of "productivity" because the amount of the phenolic compound charged is necessarily much lower.

Also, with respect to procedure (3) where the phenolic compound is added to the reaction medium as a solid, and the product obtained as a solid, it was pointed out that the temperature must, of course, be sufficiently low that the phenolic compound will remain solid prior to being taken up in the reaction, i.e., not above 0° C.

While the aforedescribed process of Ser. No. 509, 629 is highly successful for the preparation of p-nitrophenols when the mixed aqueous acid medium is fresh and as afore-indicated best performance of the process is attained when the acid concentrations therein are 3 M $HNO_3$, about 0.9 M $HNO_2$, and about 2.3 M $H_2SO_4$. Also, the preferred reaction temperature is −5° C. While deviations from these preferred conditions (within the broader conditions specified) are permissible, when other than the preferred conditions are employed, increased amounts of tars are formed, lesser yields are obtained and a lower ratio of p- to o-nitro-phenol results.

However, for economic reasons when operating that process on a commercial scale, it is necessary to recycle the spent acid after recovery of the product. This acid solution is deficient in nitrous and nitric acid requirements for optimum production of the desired p-nitrophenol. By suitable addition of concentrated ingredients as well as some water the acid medium may be restored to the proper strength. By thus restoring the acid medium prior to each recycle, numerous preparations of the desired product can be made with a minimum of acid usage. It has been found, however, that on successive runs a build-up of tar is obtained along with a decrease in the ratio of p- to o-nitrophenol. Additionally, because of the tar build-up, the product becomes increasingly difficult to purify. There exists, therefore, the need for an improved process for the preparation of p-nitrophenol employing spent acid which provides for maintenance of a high p- to o-nitrophenol ratio, minimized tar formation, and allows for ease of product purification. It is the object of this invention to provide such an improved process.

In accordance with the present invention it has now been discovered that by adding a defined amount of an inert, water-soluble carboxylic acid to the mixed acid solution (nitration medium) prior to the first recycle and adjusting the level of said carboxylic acid in said mixed acid solution before each succeeding recycle, by adding the requisite amount to maintain a defined concentration, tar build-up is substantially reduced, high p- to o-nitrophenol ratio is maintained, and purification difficulties are minimized while maintaining favorable yields. Thus, as many repetitions of the process may be run as desired as long as the amount of tar formed is sufficiently low that it does not interfere with the ratio of p- to o-nitrophenol or subsequent product purification. The addition of the carboxylic acid is especially effective when the nitration conditions deviate to some extent from the idealized conditions previously indicated. That these markedly improved results were obtained was surprising in view of the fact that the acid employed is inert in the reaction and that so much acid, albeit of different types, is already present. Additionally, the acids that may be effectively employed may be of different physical form in their pure states.

The acids which may be used in the process of this invention are aliphatic carboxylic acids of the mono- and di-basic variety that are suffiiciently water soluble and inert in the reaction process. The monobasic acids have the general formula R—COOH wherein R may be hydrogen, alkyl of up to about 5 carbon atoms, and substituted alkyl of similar carbon content wherein the substituents include hydroxyl and halo radicals. The dibasic acids have the general formula HOOC—$(CH_2)_n$—COOH wherein $n$ is an integer from 0 to about 3. Suitable acids include, for example, formic, acetic, propionic, chloroacetic, hydroxyacetic, oxalic, etc. Acetic acid is preferred. The acid is employed at concentrations of from about 0.5 to about 20%, preferably from about 2 to about 10%, by weight or volume, depending upon whether the acid is in solid or liquid form, based on the total volume of the restored mixed acid solution.

It will be appreciated that it is the presence of the aliphatic acid during the nitration reaction which effects the process improvements afforded by the present invention. Accordingly, rather than adding the carboxylic acid to the mixed acid solution either before or after restoring the mixed acid but prior to the recycling of the said solution, it may, if desired, be added along with the phenol during each recyclization, the total amount so added however not resulting in exceeding 20% concentration. Such addition is particularly appropriate where the phenol is in liquid form. Also, another satisfactory procedure is to add relatively small amounts of the aliphatic acid i.e., from about 0.5% to 1% prior to each recyclization based on the mixed acid solution, whereby the amount thereof present in the nitration mixture is gradually built up in the course of succeeding runs to the final limiting concentration.

The invention is illustrated by the examples which follow.

EXAMPLE 1

Nitration of phenol—no carboxylic acid added to recycle acid

The mixed acid solution (i.e., nitration medium) was prepared by adding sufficient 97% sulfuric acid, $N_2O_4$ and 70% nitric acid to water to obtain 900 mls. of solution which is 2.4 M with respect to $H_2SO_4$, 2.0 M with respect to $HNO_3$ and 0.89 M with respect to $HNO_2$. To this solution in a 2-liter flask fitted with thermometer, addition funel and Dry Ice condenser there was added with stirring 102 grams of 92% phenol in water over 1.5 hours while maintaining the temperature at 0° C. The product was precipitated as a crystalline solid. The temperature was then raised to 25° C., and quickly cooled to 0° C., to enlarge the crystal size and convert any remaining traces of nitrosophenol to nitrophenol. The whole was then filtered and the solids analyzed by vapor phase chromatography. The filtrate (i.e., spent acid solution) was analyzed. Then, to 750 ml. of the filtrate suitable additions of $H_2SO_4$ and $HNO_3$ acids, $N_2O_4$, and water were made to provide 900 mls. of mixed acid solution for recycle having the same molarities as the initial acid solution. Using this "restored" acid solution the process was repeated. Following this procedure three repeat (i.e., recycle) runs were carried out. Results in terms of yields, ratios of p- to o-nitrophenol, and tar contents for the three recycle runs are given in Table I.

TABLE I

[Nitration of phenol-No carboxylic acid in recycle acid]

| Run | Percent yield | Ratio PNP/ONP | Percent tars |
|---|---|---|---|
| Recycle: | | | |
| No. 1 | 90.4 | 7.8 | 2.0 |
| No. 2 | 84.1 | 6.6 | 7.3 |
| No. 3 | 90.6 | 6.6 | 8.1 |

These results show the amount of tar build-up in the course of the three recycle runs.

EXAMPLE 2

The procedure of Example 1 was repeated, except that to the recycle acid solution there was added 2.2% by volume of acetic acid (glacial) based on the 900 ml. final volume of the restored acid solution prior to the first recycle run. Additionally, prior to each subsequent recycle run, the acetic acid content of the solution was adjusted to 2.2%, based on the analyses, by addition of the appropriate amount of glacial acetic acid prior to final dilution to the use volume. Results in terms of yields, ratios of p- to o-nitrophenol, and tar contents are given in Table II.

TABLE II

[Nitration of phenol-2.2% acetic acid in recycle acid]

| Run | Percent yield | Ratio PNP/ONP | Percent tars |
|---|---|---|---|
| Recycle: | | | |
| No. 1 | 91.6 | 8.1 | 2.8 |
| No. 2 | 81.4 | 9.2 | 3.2 |
| No. 3 | 85.9 | 10.8 | 3.2 |

These results show that the build-up of tar content is considerably reduced after 3 recycle runs compared to the same number of recycle runs without the addition of acetic acid as shown in Table I of Example 1. Also, the yields and ratios are maintained at a high level.

EXAMPLES 3–10

Nitration of phenol under various conditions and with various carboxylic acids Additional examples (3–10), carried out after the fashion of Examples 1 and 2, show the improved results obtained in accordance with the invention using different conditions of $HNO_3$ and $HNO_2$ molarity, different carboxylic acids and concentrations thereof and different reaction temperatures. The pertinent data with respect to these examples are given in Table III.

As will be seen from Table III, in Example 3 where the acetic acid concentration was increased to 11% (over the 2.2% used in Example 2) tar build-up was substantially lower than in Example 2. Also, in Examples 4–10, where a higher $HNO_3$ molarity (nearer the "ideal" 3 M concentration) was used, the tar build-up was markedly lower than in Example 2. Finally, in Examples 4 and 10, where the $HNO_3$ concentration is near "ideal" and the $HNO_2$ concentration is also near "ideal" (i.e., 0.89 M), tar build-up is lowest.

In all cases where an acid addition was made, improved stirring of the reaction mixture was possible and a more crystalline and readily filterable product was obtained.

remains, (4) restoring the spent mixed acid solution to the acid concentration levels initially provided in step 1 and (5) recycling the restored acid solution to step 1; the improvement which comprises adding to the mixed acid solution from about 0.5% to about 20% of a water-soluble carboxylic acid selected from the group consisting of (a) a monocarboxylic acid of the formula R—COOH, where R is hydrogen, alkyl of from 1 to about 5 carbon atoms and substituted alkyl of from 1 to about 5 carbon atoms, the substituents of which are selected from hydroxyl and halo and (b) a dicarboxylic acid of the formula $HOOC-(CH_2)_n-COOH$ wherein $n$ is an integer from 0 to about 3; the percentage of said carboxylic acid so added being by volume where said carboxylic acid is in liquid form and by weight where said acid is in the solid form, based on the total volume of the restored acid solution.

2. The process of claim 1 wherein the carboxylic acid is added to the mixed acid solution prior to the first recyclization.

3. The process of claim 2 wherein from about 2% to about 10% of carboxylic acid is added.

4. The process of claim 3 wherein, prior to each recyclization after the first, carboxylic acid is added as necessary to adjust the concentration thereof in the mixed acid solution to approximately the same concentration as provided for the first recyclization.

5. The process of claim 4 wherein the carboxylic acid is acetic acid.

TABLE III

[Nitration of phenols under various conditions and with various carboxylic acids]

| Example Number | M $HNO_3$ | M $HNO_2$ | Carboxylic acid | Carboxylic acid conc. by vol. or wt. percent | Temp., °C. | Recycle runs | Percent yield [1] | Percent tars [1] | Ratio PNP/ONP [1] |
|---|---|---|---|---|---|---|---|---|---|
| 3 | 2.0 | 0.89 | Acetic | 11.0 | 0 | 10 | 85.8 | 2.9 | 8.6 |
| 4 | 3.0 | 0.91 | do | 2.2 | −5 | 7 | 83.3 | 1.6 | 9.3 |
| 5 | 3.0 | 0.83 | Formic | 2.2 | −5 | 12 | 83.5 | 2.2 | 10.1 |
| 6 | 3.4 | 0.89 | Oxalic | 2.2 | −5 | 7 | 88.3 | 2.2 | 6.9 |
| 7 | 3.1 | 0.83 | Propionic | 2.2 | −5 | 7 | 80.3 | 2.0 | 7.0 |
| 8 | 3.1 | 0.85 | Hydroxyacetic | 2.2 | −5 | 7 | 82.7 | 1.9 | 8.4 |
| 9 | 3.1 | 0.85 | Chloroacetic | 2.2 | −5 | 7 | 78.5 | 2.0 | 7.9 |
| 10 | 3.1 | 0.89 | Acetic | 2.2 | −10 | 10 | 88.7 | 1.8 | 9.8 |

[1] Figures given are averages for each series.

We claim:

1. In a process for nitrating phenol to produce a predominantly para-nitrated phenol which comprises the steps of: (1) providing an aqueous mixed acid solution containing from about 1 mole to about 10 moles per liter of nitric acid, from about 0.4 mole to about 2 moles per liter of nitrous acid and from about 1.7 moles to about 6.4 moles per liter of sulfuric acid, and (2) adding the phenol in solid form to said mixed acid solution while maintaining the reaction mass at a temperature of from about −20° C. to about 0° C. and under a pressure of from 0 to about 100 p.s.i.g., whereby formation of an oil phase in the reaction mass is substantially completely avoided and the nitrated phenolic compound product is precipitated from said solution in solid form, the amount of said phenol added being such that the moles of nitric acid present per liter of said solution always exceeds by at least one mole the moles phenol added per liter of said solution; the total amount of phenol added not exceeding 5 moles per liter of said solution, (3) separating the resulting nitrated phenol product from the reaction mass by filtration, whereby a spent mixed acid solution 6. The process of claim 1 wherein the carboxylic acid is added to the mixed acid solution along with the phenol during each recyclization.

7. The process of claim 6 wherein the carboxylic acid is acetic acid.

8. The process of claim 1 wherein from about 0.5% to about 1% of the carboxylic acid is added to the mixed acid solution prior to each recyclization.

9. The process of claim 8 wherein the carboxylic acid is acetic acid.

References Cited

UNITED STATES PATENTS 2,868,844  1/1959  Coffield et al. _____ 260—622

OTHER REFERENCES

Buton et al., "J. Chem. Soc." (1950), pp. 2630–2644.

Arnall, "Chem. Soc. Jr." (1924), 125, pp. 811–6.

BERNARD HELFIN, Primary Examiner

W. B. LONE, Assistant Examiner